March 3, 1970 R. C. FISCHER 3,498,241
VERTICAL SEED PLATE PLANTER
Filed Aug. 11, 1967 2 Sheets-Sheet 1

INVENTOR
RAYMOND C. FISCHER
J. K. McNeill
ATTY

March 3, 1970     R. C. FISCHER     3,498,241
VERTICAL SEED PLATE PLANTER
Filed Aug. 11, 1967     2 Sheets-Sheet 2
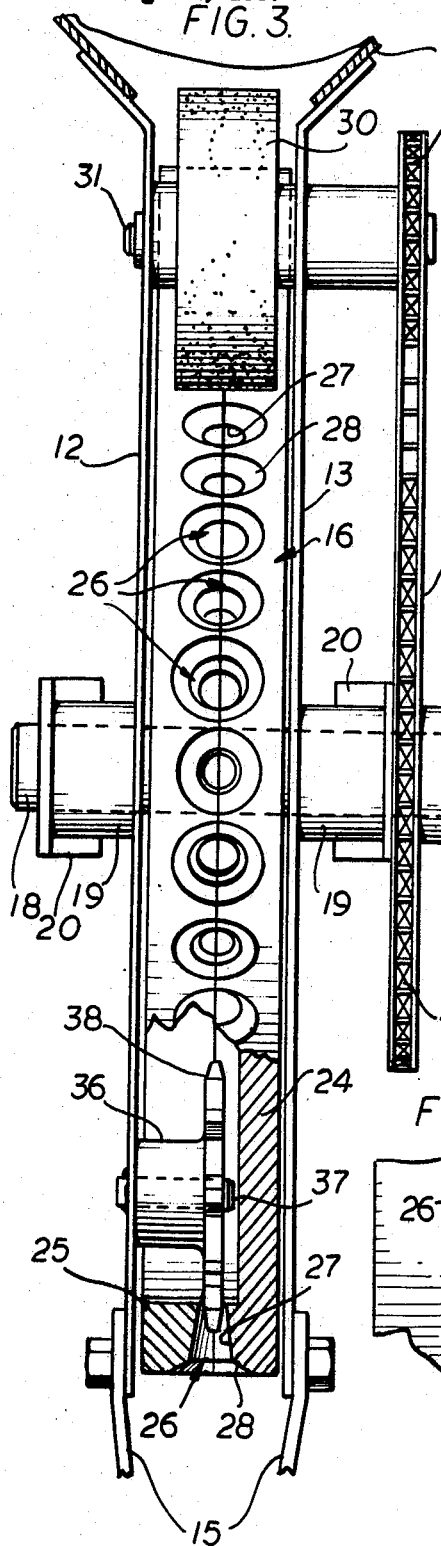
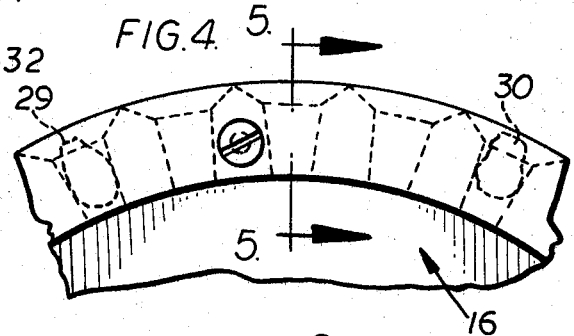
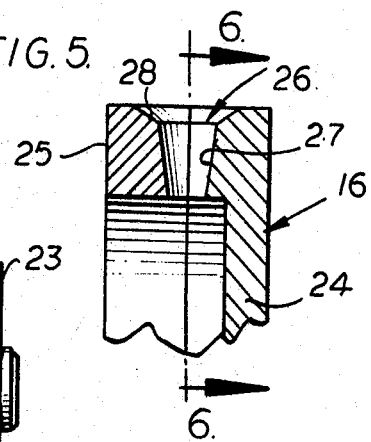
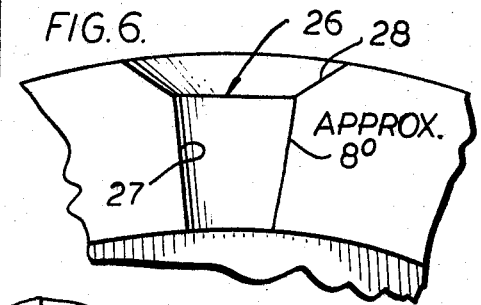
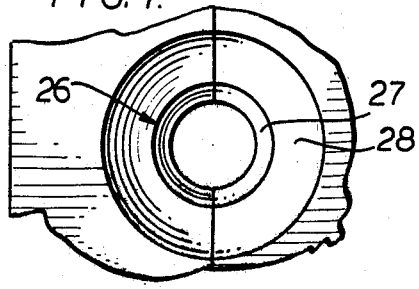
INVENTOR
RAYMOND C. FISCHER
J. L. McNeill
ATTY United States Patent Office 3,498,241
Patented Mar. 3, 1970

3,498,241
VERTICAL SEED PLATE PLANTER
Raymond C. Fischer, Hinsdale, Ill., assignor to International Harvester Company, Chicago, Ill., a corporation of Delaware
Filed Aug. 11, 1967, Ser. No. 659,912
Int. Cl. A01c 7/18
U.S. Cl. 111—77        6 Claims

ABSTRACT OF THE DISCLOSURE

A rotatable vertical seed plate has its upper portion in communication with seed in a hopper and has peripheral seed cells each of which is so shaped as to receive and frictionally retain a single seed and carry it downwardly for discharge when the cell is inverted during rotation of the plate. The size of the seed received by the cell may vary but it cannot exceed the size of the cell. Each cell is frusto-conical in shape with its small end directed radially inwardly and the cell's angle of taper is held within relatively narrow limits below which the cell will have limited tolerance for seed size, and above which the seed will not be retained in the cell. A knockout wheel is provided having teeth penetrating the inner end of the cell to dislodge the seed.

---

This invention relates to planters and particularly to a vertical seed plate having peripheral cells adapted to pick up seeds from a container above and discharge them below when the seed cell is inverted during rotation of the plate.

In the production and sale of conventional seed plate planters it is necessary to provide a great many plates having cells of different size to match the size of the seed to be planted, and one of the important problems facing the industry is to provide a seed plate with cells having a tolerance for seed of different size. In modern high speed planting another problem involves the limitation on the peripheral speed of the seed plate to assure filling the cells. A vertical seed plate planter permits cells to be more closely spaced so that a great many more cells can be accommodated in the periphery of the plate, allowing relatively low peripheral speeds to aid cell fill while depositing seeds at relatively high speeds.

In known planters of this type the size and shape of the cell have been so chosen as to easily pick up seeds and discharge them by gravity as the plate rotates, and considerable effort has been expended in the designing of retainers concentric with the periperal portion of the plate extending between the points of seed pick-up and discharge to prevent seed leaving the cell before it reaches the discharge point near the ground. Such retainers have disadvantages in addition to their cost, such as damaging the seed, and an object of this invention is the provision of an improved vertical seed plate planter having novel seed receiving and retaining means, and characterized by simplicity and efficiency.

Another object of the invention is the provision, in a vertical seed plate planter, of seed cells having a peripheral opening large enough to receive seeds of different size and tapering radially inwardly at a taper angle of such a magnitude that a seed received in the cell is frictionally retained even after the cell is inverted at the bottom of the plate during rotation of the plate. The size of the seed received by the cell may vary but it cannot exceed the size of the cell.

Other objects and advantages of the invention will become clear from the following detailed description when read in conjunction with the accompanying drawings, wherein:

FIGURE 3 is a sectional end view on a larger scale of the structure shown in FIGURE 2;

FIGURE 4 is an enlarged detail in side elevation of a portion of the periphery of the seed plate shown in FIGURE 2;

FIGURE 5 is a section taken on the line 5—5 of FIGURE 4;

FIGURE 6 is a section taken on the line 6—6 of FIGURE 5; and

FIGURE 7 is a plan view of the structure shown in FIGURE 6.

Figure 1:
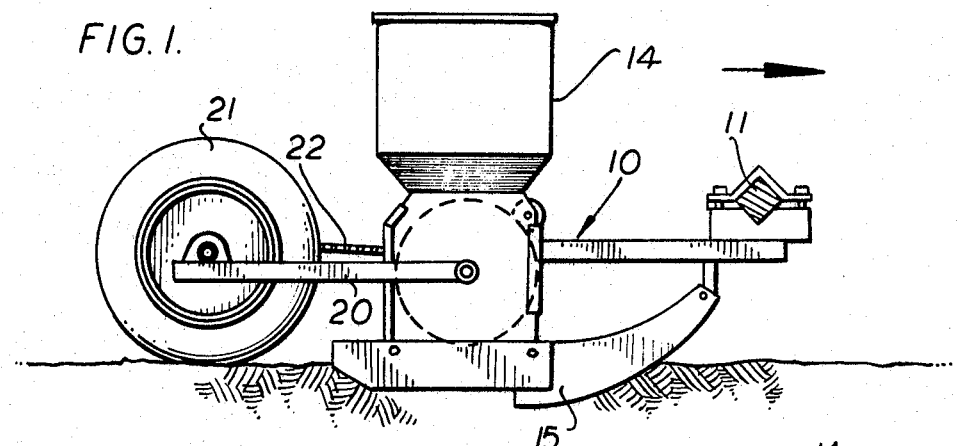
FIGURE 1 is a diagrammatic view in side elevation of a planter unit having seed metering means therein incorporating the features of this invention.

Applicant has discovered that a tapered seed cell having a taper angle held within a restricted range frictionally retains a seed such as corn, the size of which may vary but it cannot exceed the size of the cell in which it is received, the seed being retained in the cell until it is ejected by knockout means penetrating the smaller radially inner end of the cell. With this in view, applicant has embodied a seed plate incorporating the features of this invention in a conventional planter unit indicated diagrammatically in FIGURE 1 and comprising a supporting frame 10 mounted upon a tool bar 11 and to which is secured a planter boot structure including laterally spaced plates 12 and 13 upon which is mounted a seed hopper 14 and a furrow opener 15. Seed metering mechanism for receiving seed from the hopper and discharging it into the furrow formed by the furrow opener 15, is provided in the form of a seed plate 16 disposed between side plates 12 and 13, having a hub portion 17 rotatably mounted upon an axle or shaft 18 and rotatable in bearings 19 secured to arms 20 which extend rearwardly and have mounted therebetween a ground engaging wheel 21.

A chain 22 drivingly connects the wheel 21 to a sprocket wheel 23 mounted on shaft 18 for revolving seed plate 16.

As shown in FIGURES 3 and 5, wheel 16 has a flattened face portion 24 and an axially offset peripheral portion 25 in which are formed circumferentially spaced seed cells 26, each of which forms an orifice penetrating the offset peripheral portion 25 and includes a frusto-conical seed receiving and retaining portion 27 with a chamfered outlet 28 to facilitate cell fill.

As indicated in FIGURE 6, the cell taper provides an included angle of approximately 8°. Applicant found that approximately this angle is critical for the frictional retention or wedging of seed into the cell so that it will not be dislodged by gravity when the cell is inverted from the receiving position indicated in FIGURES 4, 5, and 6.

Seeds of different size are idicated at 29 and 30 in FIGURE 4, and it should be understood that with a substantially larger taper angle, the seed would not wedge into the cell and a substantially smaller taper angle would restrict the tolerance to seed size.

Figure 2:
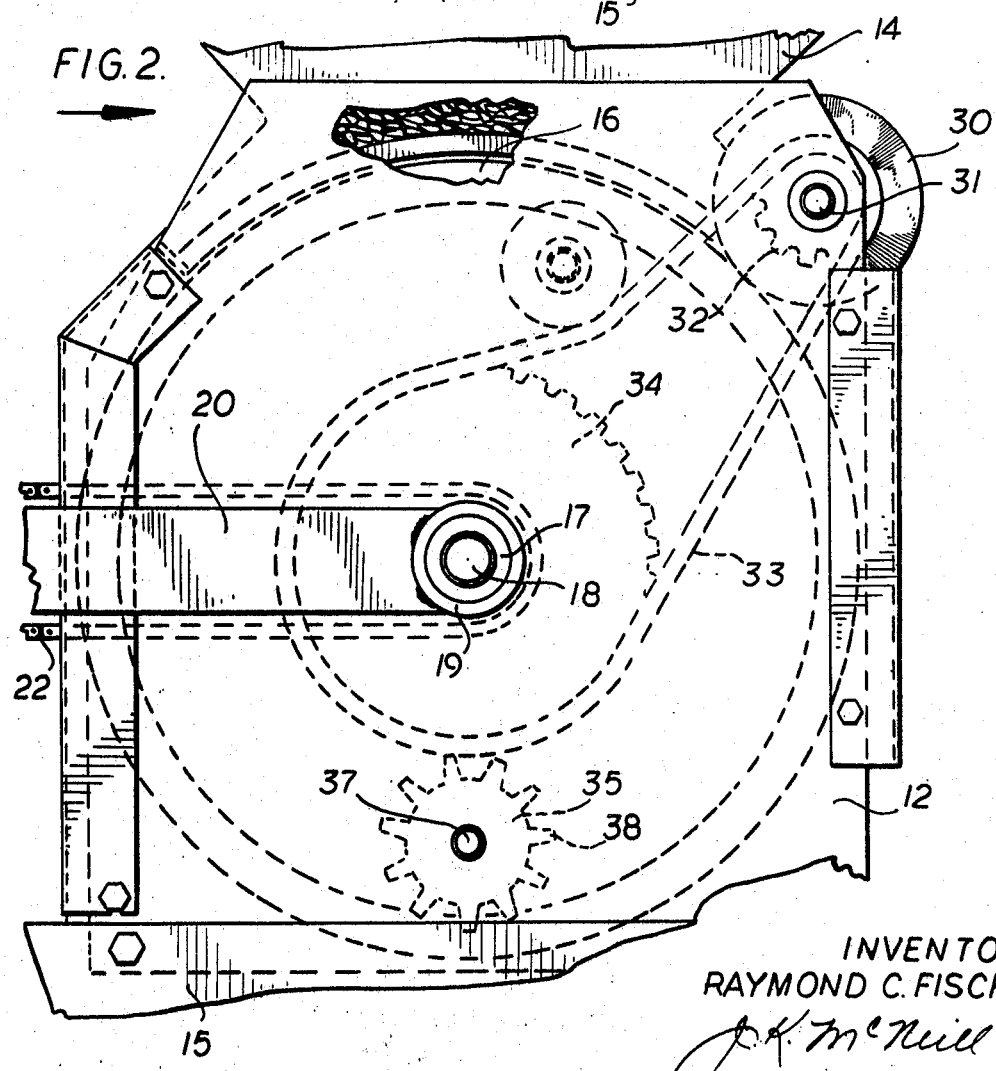
FIGURE 2 is an enlarged detail, with parts broken away, of the seed metering structure shown in FIGURE 1.

The planter travels in the direction of the arrow in FIGURES 1 and 2 and a circular brush 30 is mounted in the boot on a shaft 31 and engages the periphery of the seed plate in the path of seed distributed by the seed plate and fed thereto from hopper 14. Brush 30 is driven from a sprocket wheel 32 mounted on shaft 31 and connected by a chain 33 to a sprocket wheel 34 mounted on shaft 18.

When the plate 16 revolves until cells 26 reach the inverted position indicated at the bottom of FIGURE 3 preparatory to discharging seed into the furrow formed by the furrow opener 15, the seed in each cell is ejected by the provision of a wheel 35 having a hub 36 rotatably mounted on a pin 37 affixed to and projecting inwardly from wall 12 of the boot. Wheel 35 has teeth 38, successive teeth 38 being spaced for reception in successive cells 26 from the inner end of smaller diameter, as indicated in FIGURE 3, to dislodge the seed and allow it to fall by gravity into the furrow.

It is believed that the construction and operation of the novel vertical seed plate of this invention will be clearly understood from the foregoing description. It should likewise be understood that the invention has been described in its preferred embodiment and that modifications may be made therein without departing from the spirit of the invention.

What is claimed is:

1. In a planter having a seed hopper, a furrow opener and a seed boot through which seed passes from the hopper to the furrow formed by the furrow opener, a generally vertically disposed seed plate rotatably mounted in the boot having its upper portion in communication with the seed in the hooper and its lower portion adjacent the furrow opener, said seed plate having circumferentially spaced radial seed cells in its periphery, each of said cells having radially inwardly converging walls to form a frusto-conical cell having a taper angle of such magnitude that a seed received therein by gravity from the hopper will be frictionally retained therein when the cell is inverted adjacent the furrow opener during rotation of the plate and means to dislodge the seed received by each cell.

2. The invention set forth in claim 1, wherein the outlet of the seed cell is chamfered to facilitate entrance of seed into the cell.

3. The invention set forth in claim 1, wherein the included taper angle of the cell is approximately 8°.

4. The invention set forth in claim 1, wherein the included taper angle of the cell wall is not less than 6° and not more than 10°.

5. The invention set forth in claim 1, wherein said plate has a flattened face adapted for mounting on an axle and an axially offset peripheral portion in which said frusto-conical cells are formed as orifices extending radially therethrough.

6. The invention set forth in claim 5, wherein said means to dislodge the seed received by each cell comprises a toothed wheel rotatably mounted on the boot and disposed interiorly of said offset portion with its teeth arranged to successively penetrate said cells to dislodge the seed retained therein.

References Cited

UNITED STATES PATENTS

| | | | |
|---|---|---|---|
| 1,161,369 | 11/1915 | Ayers | 111—77 |
| 2,510,658 | 6/1950 | Rassmann | 222—220 X |
| 3,087,444 | 4/1963 | Ferguson et al. | 111—74 |

ROBERT E. PULFREY, Primary Examiner

RONALD C. HARRINGTON, Assistant Examiner

U.S. Cl. X.R.

221—88